Jan. 28, 1969 J. S. CORRIGALL ET AL 3,424,633
METHOD OF MAKING STRAP MATERIAL
Original Filed July 10, 1964

INVENTORS.
JAMES STEPHEN CORRIGALL,
RAYMOND R. WATERMAN &
KENNETH M. DEAL
BY
their ATTORNEYS Jan. 28, 1969  J. S. CORRIGALL ET AL  3,424,633
METHOD OF MAKING STRAP MATERIAL
Original Filed July 10, 1964  Sheet 2 of 2

INVENTORS.
JAMES STEPHEN CORRIGALL,
RAYMOND R. WATERMAN &
BY KENNETH M. DEAL
their ATTORNEYS

3,424,633
METHOD OF MAKING STRAP MATERIAL

James Stephen Corrigall, Greenwich, Raymond R. Waterman, Easton, and Kenneth M. Deal, Norwalk, Conn., assignors to R. T. Vanderbilt Company, Inc., New York, N.Y., a corporation of New York
Original application July 10, 1964, Ser. No. 381,630, now Patent No. 3,295,529. Divided and this application Sept. 9, 1966, Ser. No. 592,242
U.S. Cl. 156—79          5 Claims
Int. Cl. B32b 5/18, 31/06; B29d 27/00

ABSTRACT OF THE DISCLOSURE

A method of making laminated fully air-breathable foam-fabric articles comprising the steps, in the order given, of supporting a first breathable fabric web on a forming surface, applying a layer of air-frothed polyvinyl chloride liquid foam on the first web, laying in a second breathable fabric web over the foam layer to form a laminate and heating the laminate to gel and fuse the foam. The laminate is then cooled to a temperature substantially below its fusion temperature. Thereafter, it is heat and pressure formed along narrow bands to collapse the foam cell structure into a dense film-like layer and is severed along the bands, the film-like layer constituting a closed, mechanically-bonded edge or border of the article.

---

The present application is a division of application Serial No. 381,630, filed July 10, 1964.

This invention relates to strap material for wearing apparel and, more particularly, to novel and improved extensible strap material for use as straps in support garments or the like, such as brassieres, sanitary belts, and athletic supporters, for elastic support bandages, as a stretchable element of these and other garments, and as straps for other garments such as bathing suits and slips.

In wearing apparel of various sorts, such as those mentioned above, bands or straps are used to provide support for body parts, or for a part of the garment holding, shaping or protecting a body part. In some instances, the straps are non-extensible or only moderately extensible and are therefore often uncomfortable to wear. Non-extensible garment bands or straps are usually made of one or more fabric plies stitched together along the longitudinal edges or folded over at the edges and stitched to form non-fraying, neat edges. Often, the strap carries the load imposed upon it by the body part along only strips or lines which constitute only a small proportion of the strap width, inasmuch as the body contours which it traverses, which often include relatively unyieldable parts such as bones, taut muscles or tendons, do not enable the strap to firmly contact and bear against the body evenly or uniformly.

Some parts of the garments in question have long been made of extensible material, and more recently, extensible brassiere straps have been introduced. Extensible garment bands, straps and other parts have the advantage of facilitating body movement, as compared to non-extensible garment elements. Moreover, they conform a little more closely to the contours of the body. Nevertheless, there are still pressure points, particularly at relatively sharply defined, hard projections. For example, brassiere straps are subject to pressure points at the trapezius muscle in the shoulder and at the collar bone, where stretching holds the extensible material, which is relatively stiff both longitudinally and laterally, taut against these body parts and bridges across other portions of the body along its length. Also, many types of extensible straps tend to curl and twist, thus further contributing to the uneven distribution of load.

These and other disadvantages of presently known garment straps are overcome, in accordance with the invention, by providing strap material for support garments or the like comprising a thin strip of soft flexible foam and an extensible load-carrying web on the outer surface of the foam strip, and a liner on the inner surface of the foam, the web and liner being laminated to the foam. The strap material of the invention is soft and compressible and provides a greatly improved distribution of the load carried by the element of a garment for which it is used. Any discontinuities in the body surfaces which elements made of the strap material contact and bear against compress the foam and enable a considerably greater area of the strap to be brought into load-bearing contact; in other words, pressure points are substantially eliminated and the garment is considerably more comfortable to wear. The advantages of stretchability are retained and, in fact, are enhanced by the presence of the foam layer, the foam assisting in limiting the effect of bridging of the strap material over body projections. Further, the outer load-carrying web acts only indirectly, through the foam layer, on the body.

For the inner body-contacting liner of the strap material a suitable smooth extensible fabric or flocking is preferred so as to provide a smooth, soft feel and resulting improved comfort, as compared to the rough harsh feel of many fabrics presently used in stretch-type strap material. The comfort provided by the strap material is further enhanced by its flexibility which enables it to readily conform to body contours; yet it has sufficient bulk and stiffness to resist curling and twisting. In use it cups very slightly so that the wearer's skin and flesh are gradually depressed, the edges of the strap material lying contiguous to or above the normal body contour and the center portion pressing into the body to a degree governed by the tightness required for the particular garment. The load on the strap material is thus substantially uniform transversely, there being no "digging in" of the edges of the strap material.

In addition to improving the comfort of the garment by distributing loads over a larger area of the element for which the strap material is used, the greater area provides more frictional engagement between the body and the element so that the element is firmly held in place. This property can best be described as "clinging ability." The clinging ability of some straps now used in garments, such as brassieres, may be comparable to that of the strap material of the invention, but it is obtained by providing a relatively rough-surfaced fabric which is harsher and less comfortable. In the strap material according to the invention, a relatively smooth soft fabric can be used, and the strap material will cling equally as well as harsher fabric in known strap material because of a larger contact area with the body.

In a preferred embodiment of the strap material, the edges of the outer webs are joined together by heat forming. Accordingly, no stitching is required, thus reducing the cost of manufacture. Moreover, such edges do not restrict the stretching of the straps as stitching usually does and are not subject to breaking as are the threads of stitching when extended too far. Heat formed edges are also less rough or harsh and therefore more comfortable to wear.

For a better understanding of the invention, reference may be had to the following description of exemplary embodiments, taken in conjunction with the figures of the appended drawings; in which.

Figure 1:
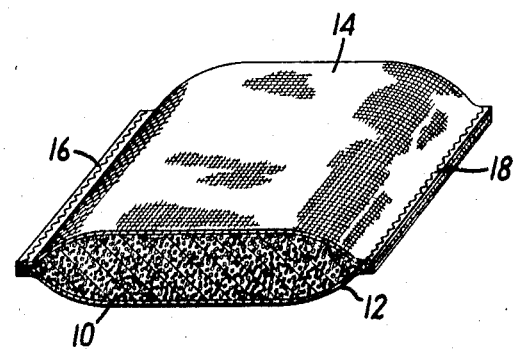
FIG. 1 is a pictorial view of a segment of one embodiment of the strap material.

Referring now to FIG. 1, the strap material of the invention comprises a thin strip 10 of flexible foam material, such as latex foam, polyurethane foam, or polyvinyl chloride foam. The foam strip 10 should be relatively soft, that is, have a high compressibility. Preferably, the proportion of the thickness of the foam when a 4 oz. load is evenly distributed over a 1 in. square piece ¼ in. thick to the uncompressed thickness should be from about 15% to about 50%. If the foam is less compressible, it will not readily conform to the body contours or effectively distribute the load on the strap material. If it is too soft, that is more compressible, it will be completely collapsed by relatively small loads, will in effect become a non-compressible member when in place on the wearer and, accordingly, will not provide very much improvement in the distribution of loads. The foam should be capable of bearing the ordinary loads imposed upon it without being fully compressed and should be susceptible of being compressed somewhat further by larger concentrations of loads at projecting parts of the wearer's body. In order to provide good uniformity of compressibility across the area of the strap material, the foam should be relatively fine-celled.

It is desirable that the foam be vapor permeable or breathable to permit moisture and air to pass through it, thus making it cool and comfortable to wear. For the same reason, foams which have a non-permeable film or skin on their surfaces are generally to be avoided.

On the surfaces of the foam strip 10 are strips 12 and 14 of extensible fabric. Preferably, the fabric strips should be inherently extensible, rather than made with encased rubber threads or the like, such threads tending to produce undesirable, spaced-apart lines of pressure and usually providing a rough, harsh surface. For example, warp-knitted fabrics such as tricot fabrics have been found to be well-suited for the strap material, inasmuch as they combine the desired low modulus of elasticity with a relatively smooth and soft surface. The fabric may be of natural or synthetic material, such as cotton, rayon or nylon. For the inner, body-contacting fabric strip 12 of the strap material, cotton is to be preferred for its softness, while for the outer fabric strip 14 a durable and more resilient material such as nylon is desirable.

It is preferable that the fabric strips be adhered to the foam strip so that the extensibility of the strap material will be a combined cooperative result of the separate extensibility of the fabric strips 12 and 14 and the foam strip 10. The fabric strips can be adhered to the foam strip by a suitable adhesive, where necessary, or by forming the foam strip 10 in situ between the fabric strips 12 and 14 and creating, thereby, a mechanical bond between the fabric and the foam. Further, by adhering the fabric to the foam, the possibility is avoided of the foam contracting lengthwise relative to the fabric strips when the strap material is stretched, thereby reducing the overall extensibility of the strap material and preventing it from fully returning to its original length when relaxed.

To obtain the full benefit of the load-spreading ability of the foam in the strap material, it is important that the fabric strip in contact with the wearer's body not have an extensibility greater than that of the outer strip. The outer strip thus carries a greater part of the load and distributes that load over a greater area of the strap material by acting through the resilient foam layer. Ideally, the inner fabric strip should carry only a nominal load or no load at all.

The lengthwise edges of the strap material should be joined together in such a way as to not substantially inhibit the extensibility of the strap material. One way of so joining the edges is by an extensible stitch, such as the zig-zag stitches 16 and 18 shown in the embodiment of FIG. 1. To make the strap material, foam and fabric strips of equal widths may be adhered together to form a laminate, and the edges of the laminate then stitched together, the stitching serving not only to join the fabric strips but also to compress the edge portions of the foam to form tapered or smoothly rounded edges.

Figure 2:
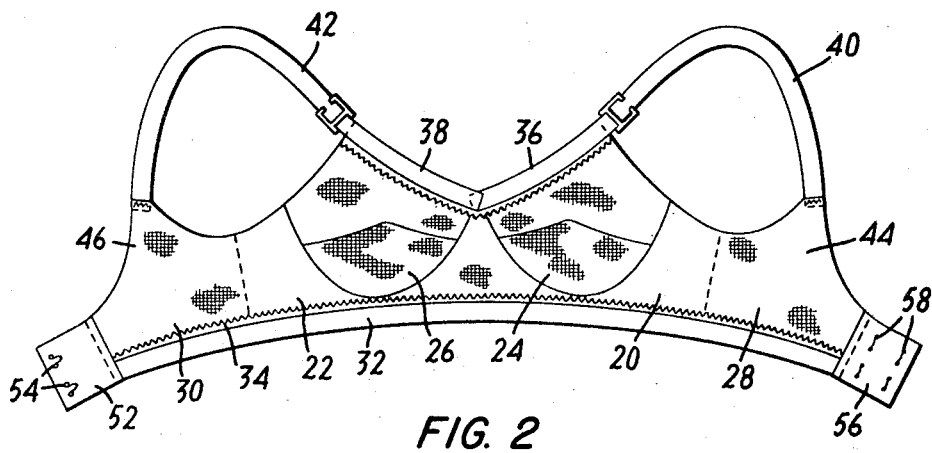
FIG. 2 is a pictorial view of a brassiere having several elements fabricated from the strap material of the invention.

Referring next to FIG. 2 of the drawings, one important use of the strap material is in various parts of a brassiere. The brassiere includes front panels 20 and 22 joined at the center and having spaced-apart breast cups 24 and 26 and back panels 28 and 30 joined, respectively, to the front panels 20 and 22. Preferably, the panels are made of a moderately elastic material. A lower, body-encircling band 32 of the strap material of the invention is joined to the lower edges of the front panels 20 and 22 and back panels 28 and 30 by a suitable type of stitch such as the extensible zig-zag stitch 34 illustrated in FIG. 2. The extensible stitch 34 enables joint stretching of the band 32 and the panels, thereby permitting freer breathing and expansion of the wearer's rib cage during body movement. The strap material used for the band 32, being soft and compressible, allows the band to conform closely to the body contours and to distribute the load over a larger area of the rib cage of the wearer.

Strips 36 and 38 of the strap material, according to the invention, are provided along the tops of the breast cups 24 and 26, to improve the confort of the brassiere in the area across the tops of the wearer's breasts. The softness and compressibility of the strap material greatly improves comfort by eliminating narrow pressure areas and distributing pressure evenly and smoothly.

The straps 40 and 42 of the brassiere are also made of the strap material of the invention. The stretchability of straps made from the strap material facilitates body movement, and their softness and compressibility provide greater distribution of the load by conforming more closely to the contours of the body.

The brassiere further comprises a back catch or hook arrangement which includes a band 52 connected to the back panel 30 and spaced-apart hooks 54 near the outer end and a band 56 connected to the end of the other back panel 28 and having two or more pairs of eyelets 58 for receiving the hooks 54. One or both of the bands 52 and 56 may be made from the strap material of the invention, preferably, at least the band 56 which lies adjacent to the wearer's body. The softness and compressibility of the strap material greatly improve the comfort of the brassiere in the area of the catch by distributing the forces on the hooks.

Preferred foams for the strap material and methods of making the foams are disclosed in copending applications assigned to the assignee of the present invention and application. More particularly, application Ser. No. 242,653 of Waterman et al. filed December 6, 1962, now U.S. Patent No. 3,288,729 discloses a method of foaming a polyvinyl chloride plastisol composition incorporating a novel alkali metal soap frothing agent by mechanical incorporation of air and the foams so produced. Application Ser. No. 273,288 of Waterman et al. filed April 16, 1963, now U.S. Patent No. 3,301,798 discloses a novel frothing agent containing an amine soap-alkali metal soap blend and a method of mechanical foaming of polyvinyl chloride plastisol formulations in the presence of said frothing agent.

The foams disclosed in the aforementioned applications have unexpectedly been found to be highly stable and to be susceptible to being applied to a vapor permeable web without any significant collapsing of the air cell structures of the foam. Accordingly, they can be deposited on a web of gas permeable fabric and gelled and fused without forming the tough, impermeable skins, which are characteristic of blown polyvinyl chloride foams or other flexible foams formed in a similar manner. Moreover, the foam is sufficiently stable to permit a relatively heavy, gas permeable fabric web to be deposited on top of a layer of the air frothed foam without strike-through or soaking up any of the liquid foam and without collapsing the foam. Nevertheless, the foam impregnates a fabric web sufficiently to form a very good mechanical adhesion between the foam and the fabric. The term "air-frothed polyvinyl chloride foam" is used herein to designate foams disclosed in the above-mentioned applications and foams produced by the methods disclosed in those applications.

Figure 3:
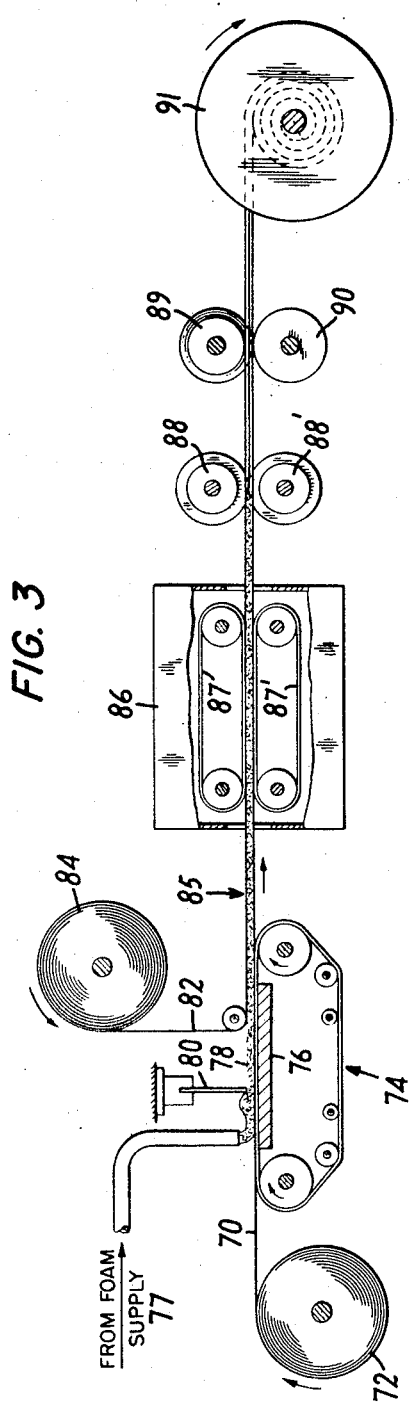
FIG. 3 is a schematic drawing of a method of making another embodiment of the strap material.

Referring to FIG. 3, a fabric web 70 is fed from a supply roll 72 onto a supporting surface, such as a conveyor 74 of the type having a fixed supporting bed 76. An air-frothed polyvinyl chloride liquid foam from a supply 77 is then deposited at a predetermined rate onto the upper surface of the fabric web 70. A foam layer 78 of predetermined thickness is formed by suitable means, such as a doctor roll or a doctor blade 80. An upper fabric web 82 taken from a supply roll 84 is laid in on top of the liquid foam layer 78. While in the illustrated method the upper web 82 is placed on the foam layer 78 downstream of the doctor blade 80, it might also be passed beneath the blade, or preferably, beneath a doctor roll.

The laminate 85 of the fabric webs 70 and 82 and the foam layer 78 is then carried along the conveyor 74 by drawing the webs at equal speeds, in order to avoid relative sliding which could disrupt the foam cell structure. The upper web 82 is freely supported on the foam layer 78, the foam having sufficient body to carry the fabric without significant strike-through. The weight of fabric is usually sufficient to embed threads and fibers of the fabric in the foam, although slight pressure can be applied when the upper fabric web 82 is laid in to ensure adequate embedment, and therefore enable a good mechanical bond between the fabrics and the foam to be obtained upon fusion and cooling of the foam.

From the conveyor 74, the fabric webs 70 and 82 with the in situ deposited, foamed plastisol layer 78 therebetween are conveyed to a suitable heating device 86 in which the foam is heated to gel and fuse it. With some types of fabrics, it may be necessary to restrain the fabric from shrinking under the temperatures needed for fusion. Shrinking in the longitudinal direction can be controlled by adjusting the longitudinal direction on the webs. Lateral restraint may be accomplished by suitable movable single layer tenters 87 and 87'. The length of the heating device 86 and the rate of movement of the laminate 85 through it are, of course, determined by the time required to accomplish complete fusion of the foam.

After the laminate 85 leaves the heating device 86, it is cooled, for example, by blowing air on it, and then heat formed between forming rolls 88 and 88' along spaced-apart narrow parallel bands. It is preferable that any heat-forming of the laminate be carried out at a temperature substantially below the fusion temperature of the foam in order to avoid damage to the cell structure in areas outside the heat-formed portions, for as the heat-formed portions are pressed together, the tendency is for portions adjacent the heat formed portions to be collapsed due to a drawing of the fabric. If excessive heat is utilized in heat forming, it may damage the cell structure in other portions of the foam. Generally, it is preferable to stay at least 25° F. to 50° F. below the fusion temperature of the foam in any heat-forming operations.

In the spaced-apart narrow parallel bands the fabric srips are squeezed together, and substantially all foam cell structure in the band is completely collapsed. The result is a dense, film-like ply between the fabric plies, the fabric being mechanically adhered to the film-like ply by embedment of threads and fibers of the fabric therein. The sheet is then severed, such as by rotary cutting blades 89 cooperating with a back-up roll 90, to form a plurality of self-sustaining strips and the strips rolled onto a roll 91.

Figure 4:
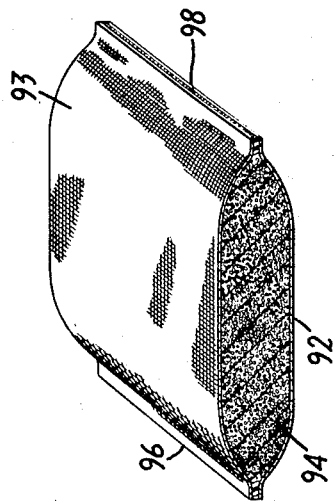
FIG. 4 is a pictorial view of a segment of another embodiment of the strap material.

FIG. 4 illustrates an end view of such a strip of strap material. The strip comprises a pair of spaced-apart webs 92 and 93 of the elastic fabric which are mechanically adhered by embedment of the fabric threads and fibers of the threads to an air-frothed polyvinyl chloride foam layer 94. At the lateral edges 96 and 98 of the strip, the foam layer 94 has been heat-formed under pressure and the cells collapsed so that narrow edge bands consisting of the outer fabric layers and a film-like, relatively dense polyvinyl chloride layer remain. Directly adjacent the edges 96 and 98, the cell structure has not been fully destroyed but has been compressed to a gradually lesser degree until the full thickness of the original sheet material remains. Accordingly, this embodiment of the strap material has longitudinally extending, bonded edges and is self-sustaining and suitable for use without stitching or other treatments to connect the fabric edges.

There is thus provided, in accordance with the invention, strap material which is fully breathable or vapor permeable; that is, there is no gas impermeable layer or film at any point across the thickness (except at the edges) and therefore the strap material is cool to wear. Moreover, the outer webs are attached to the foam, preferably by embedment of yarns or fibers of the webs in the foam. The problems of different extensibilities of the foam and the webs are thus avoided. Fabric-foam laminates utilizing air-frothed polyvinyl chloride foam and extensible webs have excellent elastic properties, and no breaking away of the webs from the foam after repeated stretching has been observed.

While the above-described specific embodiments of the strap material utilize extensible fabric strips on both of the form surfaces, other materials can be used without impairing any of the important properties, load-spreading, extensibility and breathability. For example, the inner, body contacting liner may be flocking or similar material. The outer load-carrying web may be an extensible plastic film, preferably a porous or breathable polyvinyl chloride film.

It will be understood that the above-described embodiments of the invention are merely exemplary, and those skilled in the art can readily modify and vary them without departing from the spirit and scope of the invention. Such variations and modifications are intended to be included within the scope of the invention as defined in the appended claims.

We claim:

1. A method of making laminated fully air-breathable articles of fabrics and flexible polyvinyl chloride foam comprising the steps, in the order given, of supporting a first breathable fabric web on a forming surface, depositing a layer of an air-frothed polyvinyl chloride liquid foam onto the first fabric, the foam having sufficient body to form a supporting layer for a second breathable fabric web without any substantial strike-through of the liquid foam in the first and second webs while affording penetration of the foam into the fabrics to an extent to form mechanical bonds therewith upon gelation and fusion of the foam, laying in a second breathable fabric web in overlying relation on the liquid foam to form a laminate of the fabrics and the liquid foam, heating the laminate to gel and fuse the liquid foam, cooling the fused foam to a temperature substantiailly below its fusion temperature, heat and pressure forming the laminate along narrow bands in a pattern constituting the outline of the article to be made thereby permanently to collapse the foam cells in the said bands and form a dense film-like polyvinyl chloride layer therein, and severing the laminate along the bands to leave an artice having cosed mechanically-bonded edges constituted by the dense film-like layer.

2. A method according to claim 1 wherein the laminate is cooled to a temperature within the range in which the foam is plastically deformable and pressure is applied to narrow bands while the laminate is at that temperature, the remanent heat from the gelation and fusion step constituting the heating portion of the heat and pressure forming step.

3. A method according to claim 1 wherein the fabric webs are extensible.

4. A method according to claim 1 wherein the bands are parallel and spaced-apart thereby to produce articles in the form of strips having parallel edges.

5. A method of making laminated fully air-breathable articles of fabric and polyvinyl chloride flexible foam comprising the steps, in the order given, of conveying a first breathable fabric web along a predetermined path and in supported position on a forming surface, applying a layer of an air-frothed polyvinyl chloride liquid foam on the fabric web at a predetermined rate, the liquid foam having sufficient body to form a supporting layer for a second breathable fabric web without any substantial strike-through of the liquid foam into the webs while affording penetration of the foam into the fabrics to an extent sufficient to form mechanical bonds therewith upon gelation and fusion of the foam, laying in a second fabric web on the liquid foam layer to form a laminate of the fabrics and the liquid foam, moving the laminate along a prescribed path while heating it to gel and fuse the foam, cooling the fused foam to a temperature substantially below its fusion temperature, heat and pressure forming the laminate along narrow bands constituting a pattern for the article to be made hereby to permanently collapse the foam cells in the bands and form a dense film-like polyvinyl chloride layer therein, and severing the laminate along the bands to form articles having closed mechanically-bonded edges constituted by the dense film-like layer.

References Cited

UNITED STATES PATENTS

| | | | |
|---|---|---|---|
| 2,341,979 | 2/1944 | Cunnington | 156—79 X |
| 2,628,928 | 2/1953 | Cadous | 161—159 X |
| 2,767,113 | 10/1956 | Bower | 161 |
| 2,792,320 | 5/1957 | Bower | 156—79 X |
| 2,888,414 | 5/1959 | Fuller | 156—79 |
| 2,891,288 | 6/1959 | Daley | 161—161 X |
| 2,956,310 | 10/1960 | Roop et al. | 156—79 X |
| 3,127,306 | 3/1964 | Turton et al. | 161—89 X |
| 3,192,099 | 6/1965 | Beckman et al. | 161—161 X |
| 3,240,845 | 3/1966 | Voelker | 156—78 X |
| 3,233,870 | 2/1966 | Gerhardt | 156—242 X |
| 3,256,131 | 6/1966 | Koch et al. | 156—79 X |
| 3,317,363 | 5/1967 | Weber | 161—161 |

EARL M. BERGERT, *Primary Examiner.*

C. B. COSBY, *Assistant Examiner.*

U.S. Cl. X.R.

156—242; 161—249, 161